May 20, 1952  W. M. GOODHUE  2,597,081
JOINT FOR WAVE GUIDES
Filed Sept. 9, 1948

Inventor
William M. Goodhue
By Ralph B. Stewart
Attorney

Patented May 20, 1952

2,597,081

UNITED STATES PATENT OFFICE 2,597,081

JOINT FOR WAVE GUIDES

William Melvin Goodhue, Lakeview, N. Y., assignor to Polytechnic Research and Development Company Incorporated, Brooklyn, N. Y., a corporation of New York Application September 9, 1948, Serial No. 48,457

4 Claims. (Cl. 178—44)

This invention relates to joints for coupling adjacent sections of waveguides, or for coupling adjacent sections of coaxial cable.

An object of the invention is to devise a joint for coupling adjacent sections of a waveguide or other tubular wave conductor in which good electrical contact is maintained between coupled sections, and provision is made to compensate for the electrical discontinuity inherent in the joint.

Still another object of the invention is to devise a joint for a waveguide having a broad band transmission characteristic.

A joint in a waveguide or other tubular conductor introduces a reactance which varies with frequency. According to my invention, a capacitative iris is embodied in the waveguide at the joint to compensate for the inductance introduced by the joint.

My invention is illustrated in the accompanying drawing in which

Figure 1:
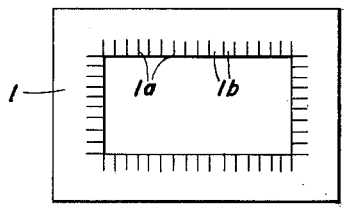
Figure 1 is a face view of a gasket employed in the joint of my invention.

Referring to the drawing, Figure 1 shows a face view of a metallic gasket 1 which is inserted between adjacent coupling flanges of adjacent sections of the waveguide. This gasket is formed of sheet metal, such as spring brass or other springy material of good conductivity. The gasket is of a shape that conforms generally with the shape of the coupling flanges, the gasket shown in Figure 1 being for coupling a waveguide of rectangular shape. The inner edge of the gasket is slit or cut at spaced points as shown at $1a$ to provide a series of spring fingers $1b$ extending inwardly of the gasket.

Figure 2:
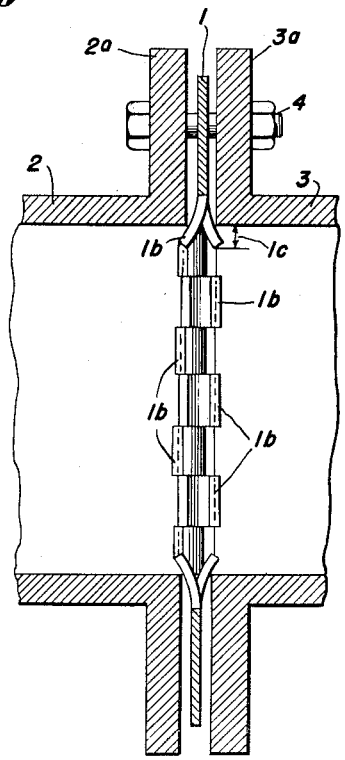
Figure 2 is a longitudinal sectional view of a joint according to my invention showing the gasket of Figure 1 on a greatly enlarged scale loosely held in the joint, and in which the gasket also provides the compensating iris.

Alternate fingers of the gasket are bent in opposite directions as shown in Figure 2 so that when the gasket is inserted between the ends of adjacent waveguide sections 2 and 3, one-half of the fingers make contact with the coupling flange $2a$ of the section 2 and the other half of the fingers make contact with the coupling flange $3a$ of the section 3. The two coupling flanges are secured together with the sections 2 and 3 in alignment by any suitable means represented by the clamping bolts 4. The electrical current in the gasket is confined to V-shaped loops formed between oppositely bent fingers, and by forming these fingers of a length considerably less than a quarter wavelength, resonance conditions do not occur and the spring gasket is capable of operating over a wide range of frequency. The discontinuity presented by the gasket with relatively short fingers is small and varies but slightly with frequency.

For the purpose of compensating for the electrical discontinuity inherent in the joint, and to thereby prevent wave reflection, the gasket extends inwardly from the inner wall of the waveguide as shown at $1c$ in Figure 2, and this arrangement of an inwardly projecting conductive ring forms a capacitative iris in the wave guide at the joint.

Figure 3:
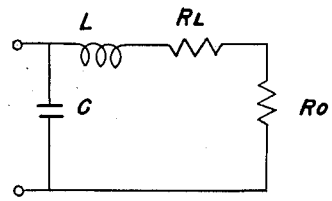
Figure 3 is an equivalent circuit diagram for the joint of Figure 2.

Figure 3 is an equivalent circuit for the arrangement shown in Figure 2. The gasket is represented by a series inductance L and a series resistance $R_L$, the values of both being dependent on frequency. The transmission system beyond the gasket is represented by the characteristic impedance load resistance $R_0$. C is a shunting capacitance introduced by iris of the gasket. L and C, if small, each affects the phase angle of the input impedance in a manner essentially proportional to frequency. Hence if C is adjusted properly, L and C may have nearly equal and opposite effects. The proper value for this adjustment can be calculated to be $$\frac{L}{C} = (R_0 + R_L)^2$$

This is the same value as obtained on considering L, C a stage of artificial transmission line matched to the resistance $R_0 + R_L$. The input impedance of said line is nearly constant in the working frequency range since the cutoff frequency is much above the working range due to the small size of L and C. Although L and C may actually vary with frequency, some compensation can be obtained depending on how close the ratio L/C is maintained constant.

Figure 4:
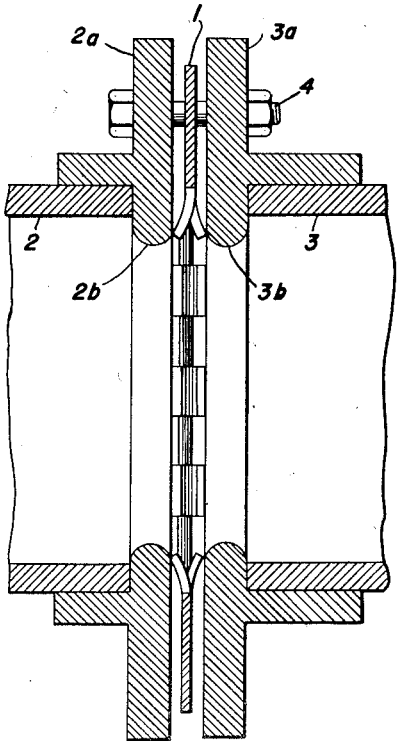
Figure 4 is a view similar to Figure 2 of a modified waveguide joint in which the compensating iris is provided by inwardly extending portions of the coupling flanges of the waveguide.

Figure 4 illustrates another construction in which the compensating iris is formed by inwardly extending portions of the coupling flanges. In this arrangement the flanges are formed separately from the waveguide sections and are secured to the sections in any suitable manner as by soldering. The flanges $2a$ and $3a$ are provided with rounded inwardly extending portions $2b$ and $3b$ on opposite sides of the gasket 1 and provide the necessary capacitance C in Figure 3. It will be understood that the inwardly extending portions 2b and 3b with the interposed gasket form a capacitative iris in the waveguide at the joint. The necessary compensating capacitance could be provided by an inwardly extending portion on only one flange, and where the compensating iris is formed by the flange, it is not necessary that the opening in the gasket be smaller than the opening in the waveguide.

It will be understood that in Figures 2 and 4 the gaskets have been shown loosely held between the coupling flanges for the purpose of illustrating how the fingers are bent in opposite directions, and while the joint will operate reasonably well when lightly clamped, it will be found desirable in practice to draw the joint up tightly.

In both forms of my invention the capacitative iris is formed of a conductive ring of substantially uniform transverse width extending inwardly from the walls of the waveguide.

What I claim is:

1. In a wave guide for the free transmission of electromagnetic wave energy, a joint for coupling adjacent sections of said guide comprising coupling flanges on adjacent sections of said wave guide, and a gasket formed of a metallic sheet having an opening of a shape conforming with the cross-sectional shape of the wave guide, said gasket being interposed between said flanges and having its inner edge portion extending inwardly a uniform distance beyond the inner wall surface of said wave guide to form a capacitative iris for substantially compensating for the electrical discontinuity of said joint, said inwardly extending edge portion having uniformly spaced linear sections thereof bent out of the plane of said sheet in one direction, and the intermediate linear sections of said edge portion being bent out of the plane of said sheet in the opposite direction.

2. In a wave guide for the free transmission of electromagnetic wave energy, a joint for coupling adjacent sections of said guide comprising coupling flanges on adjacent sections of said wave guide, and a gasket formed of a metallic sheet having an opening of a shape conforming with the cross-sectional shape of the wave guide, said gasket being interposed between said flanges and having its inner edge portion extending inwardly a uniform distance beyond the inner wall surface of said wave guide to form a capacitative iris for substantially compensating for the electrical discontinuity of said joint, said gasket being formed of spring metal with its inner edge portion slit at right angles to the edge thereof at spaced points to provide parallel fingers around the inner edge of the gasket, said fingers being bent in opposite directions to engage adjacent wave guide sections.

3. A joint according to claim 2 wherein the fingers of said gasket have a length which is small by comparison with the wave length of the wave to be transmitted through said wave guide.

4. A joint according to claim 1 wherein at least one of said coupling flanges is provided with a portion extending inwardly from the inner wall surface of the wave guide to provide a compensating capacitance.

WILLIAM MELVIN GOODHUE.

REFERENCES CITED

The following references are of record in the file of this patent:

UNITED STATES PATENTS

| Number | Name | Date |
| --- | --- | --- |
| 2,423,130 | Tyrrell | July 1, 1947 |
| 2,467,730 | Coltman | Apr. 19, 1949 |